Sept. 29, 1931.  H. H. BARBER  1,825,258
EXCAVATOR
Filed April 30, 1928   11 Sheets-Sheet 2
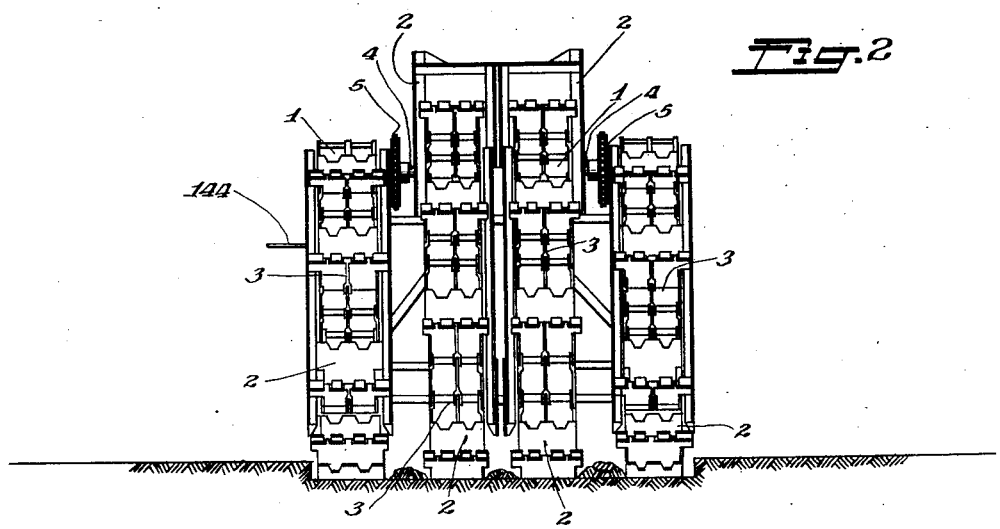
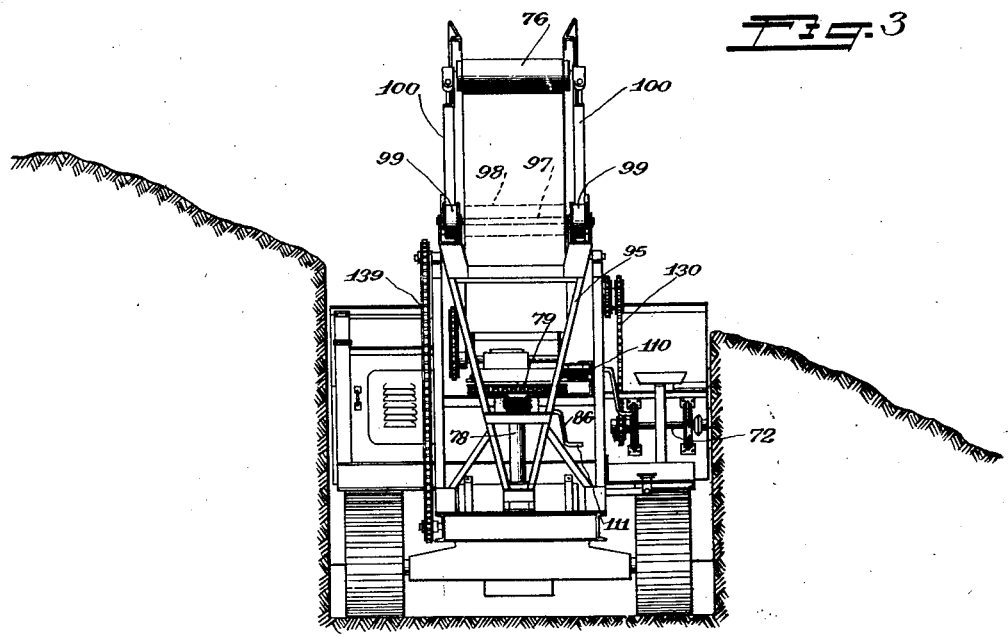
Inventor:
Harry H. Barber.
by: Charles H. Wills
Attys.

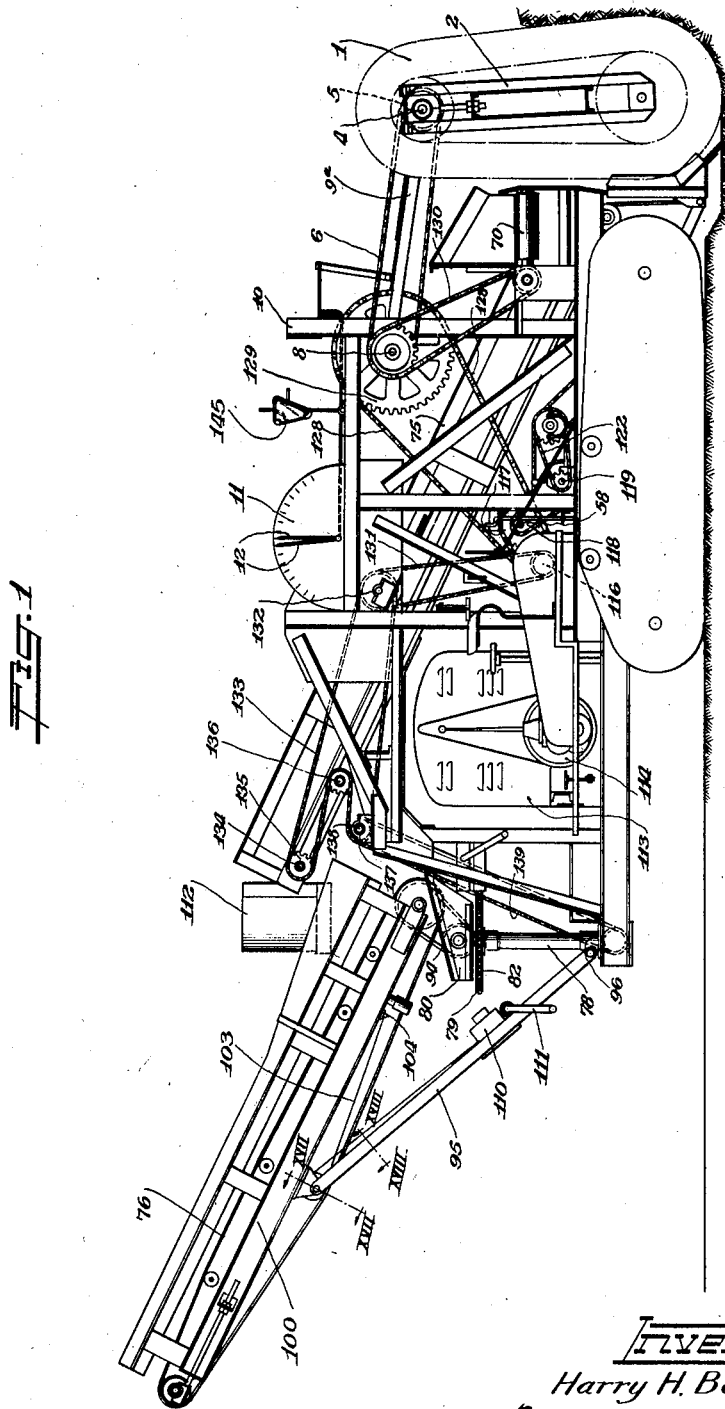

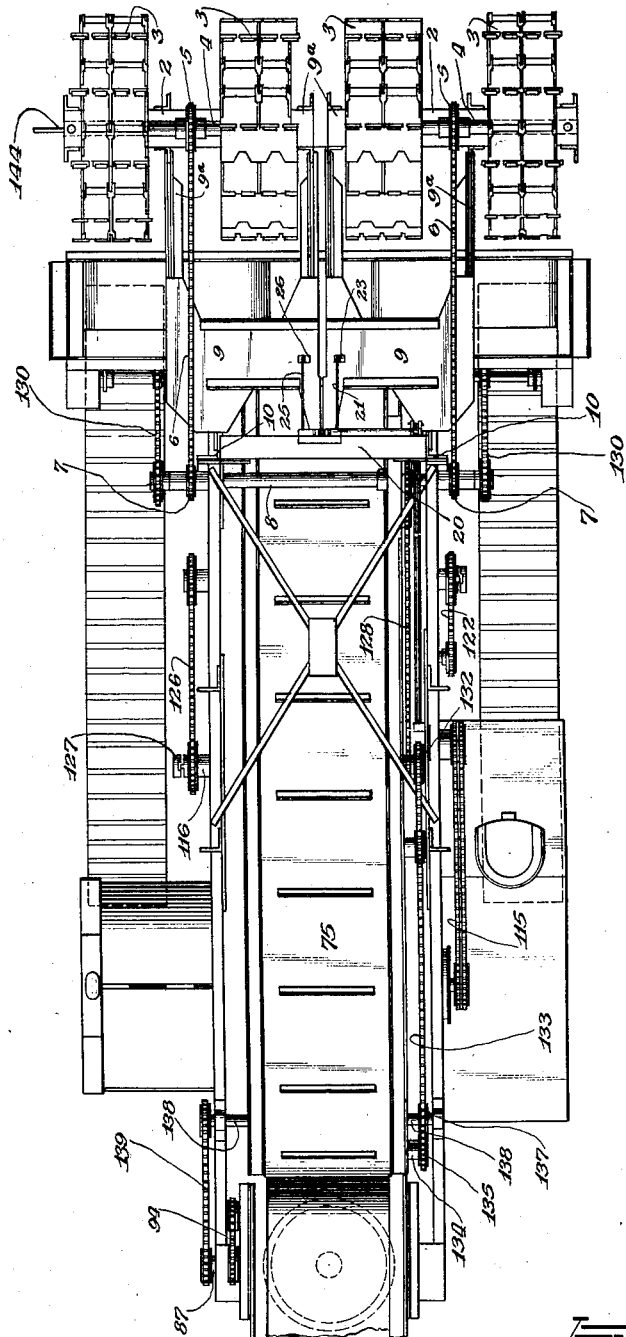

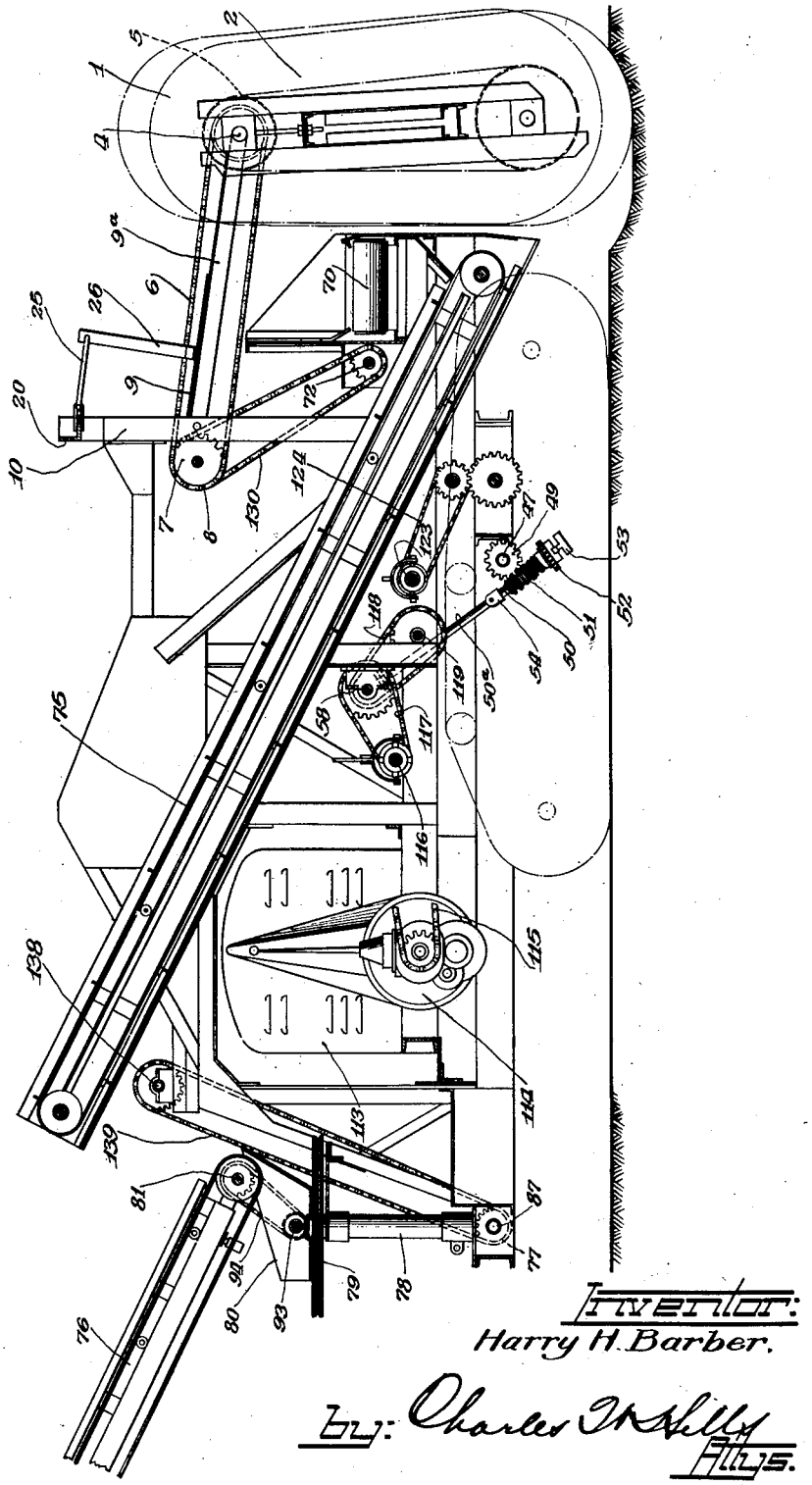

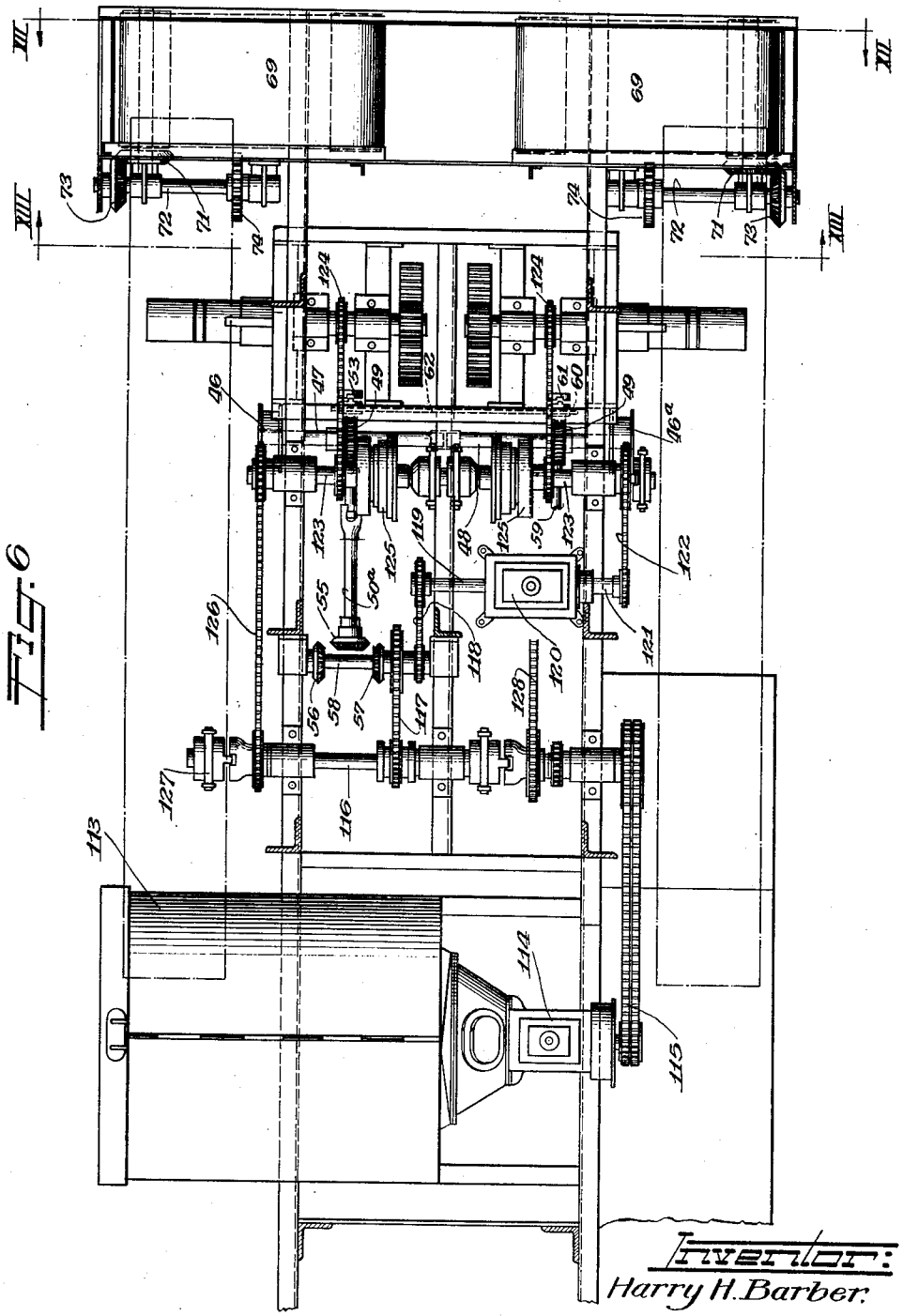

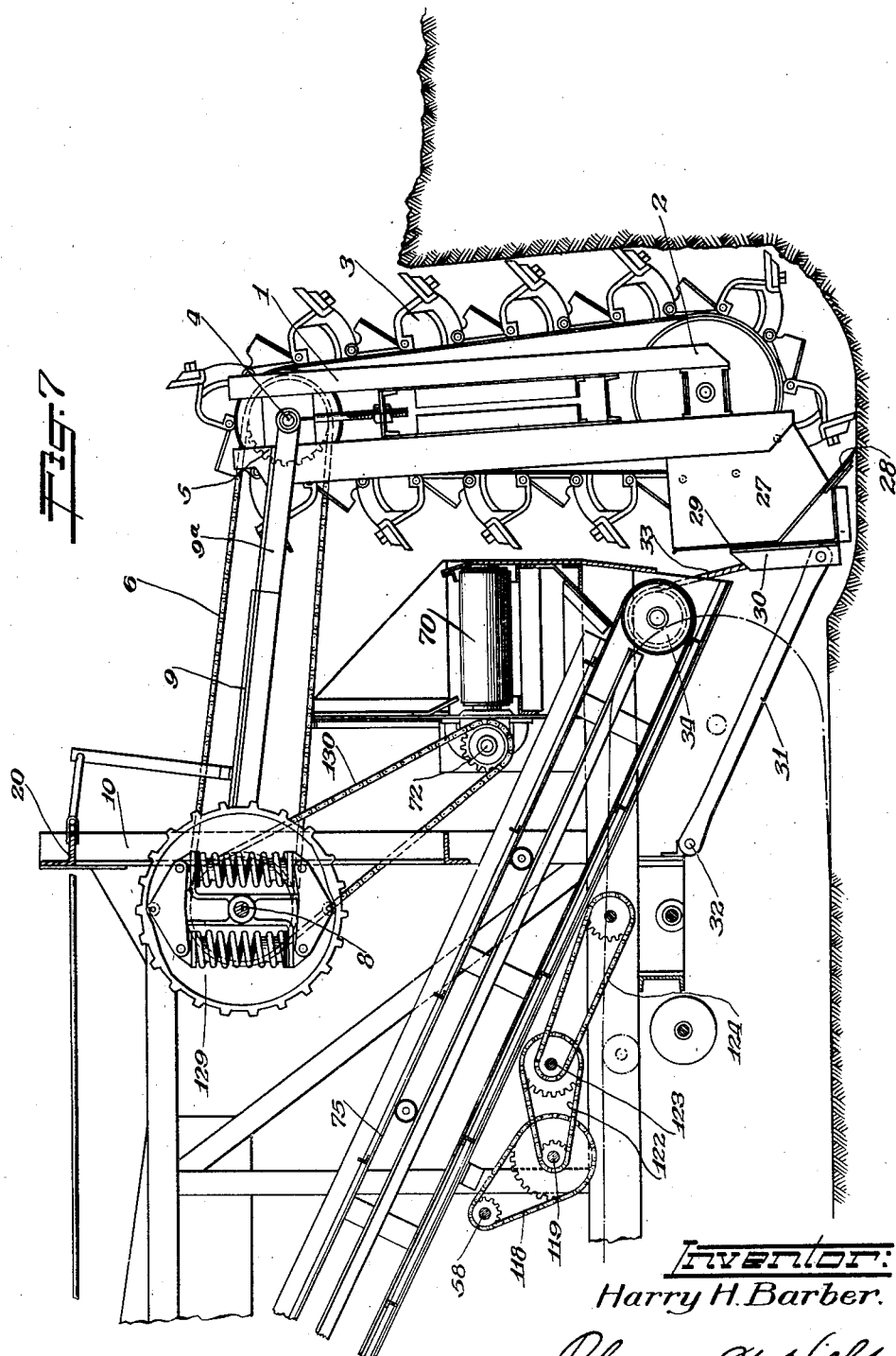

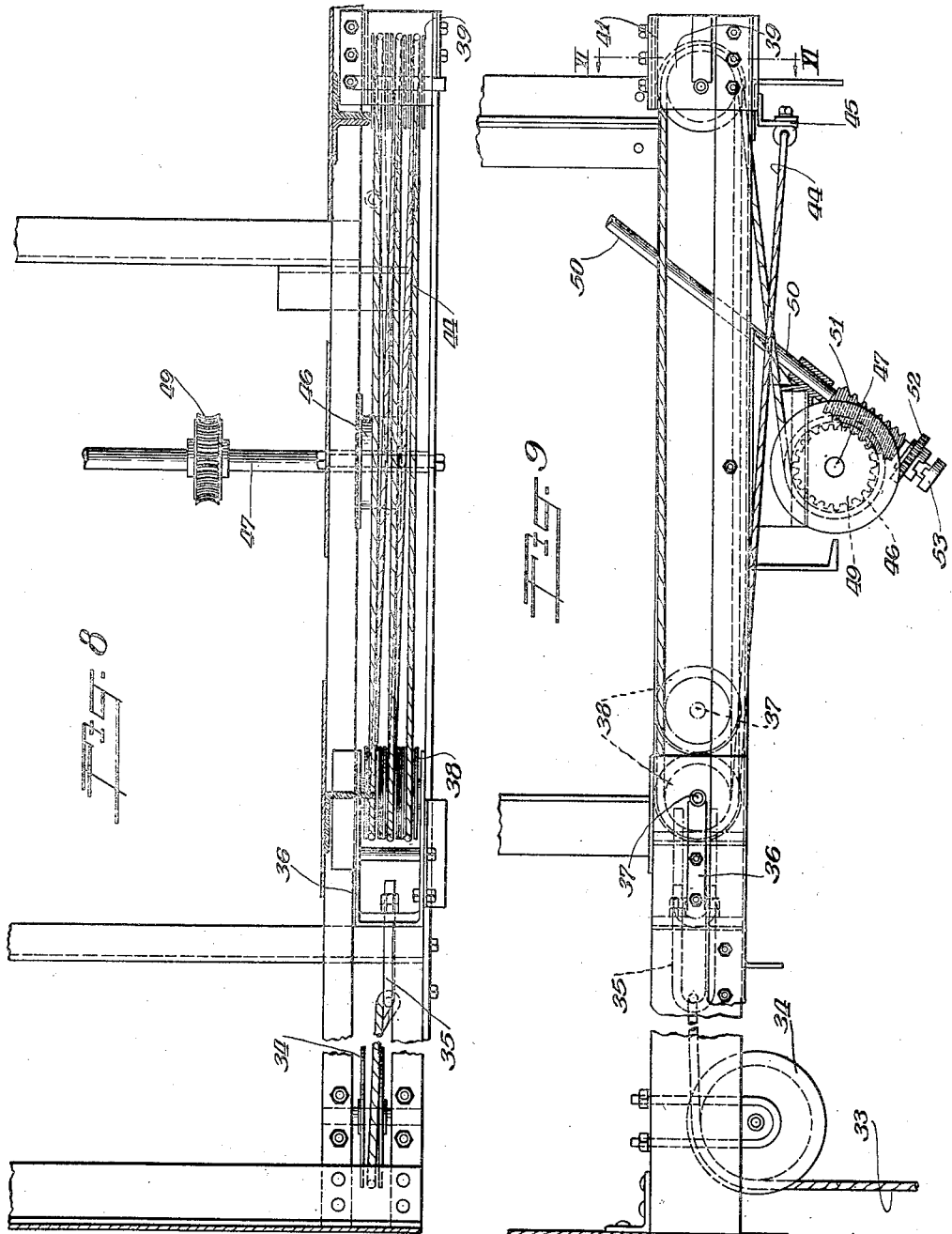

Sept. 29, 1931. H. H. BARBER 1,825,258
EXCAVATOR
Filed April 30, 1928 11 Sheets-Sheet 8
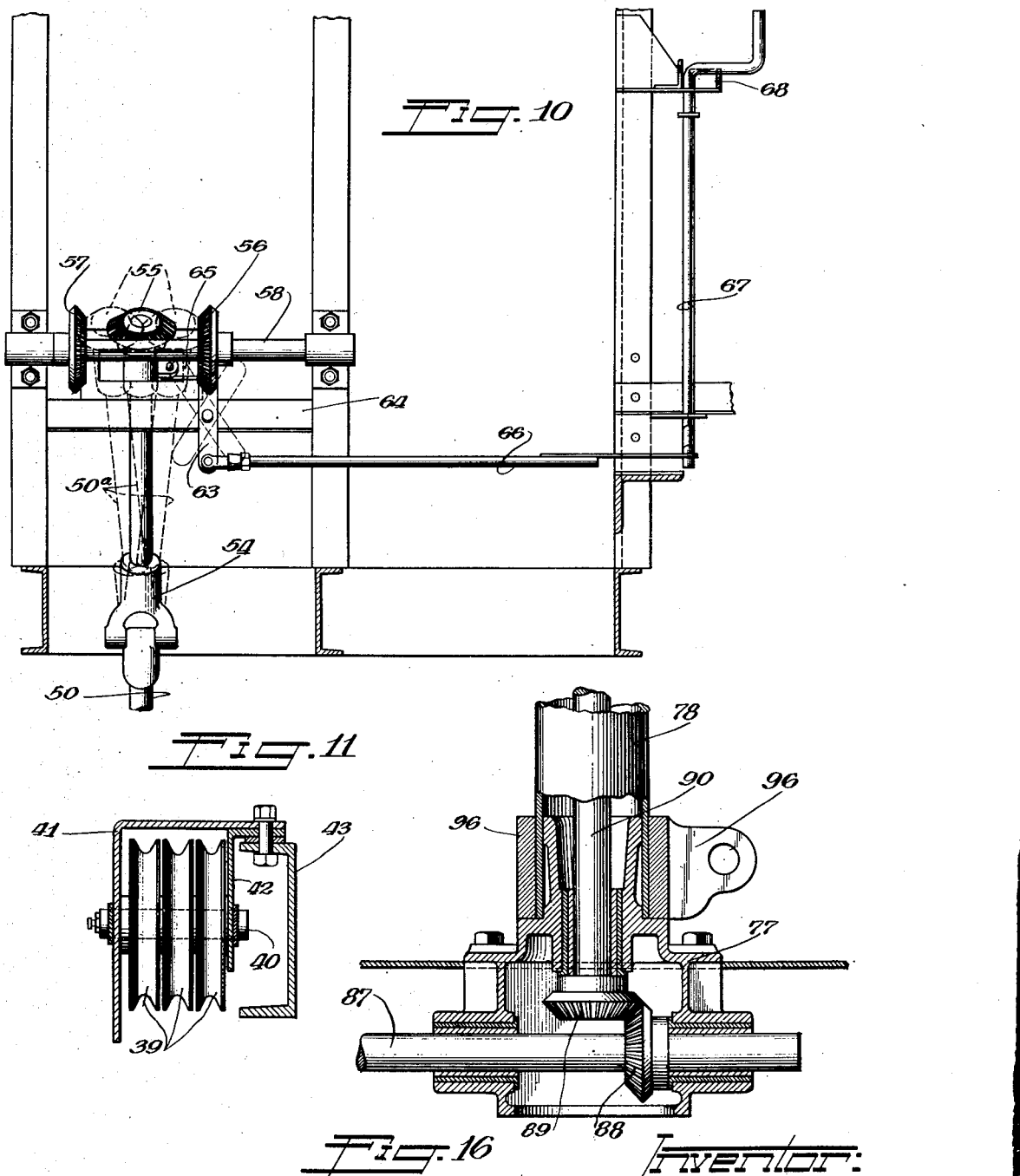
Inventor:
Harry H. Barber.
by: Charles H. Wills
Attys

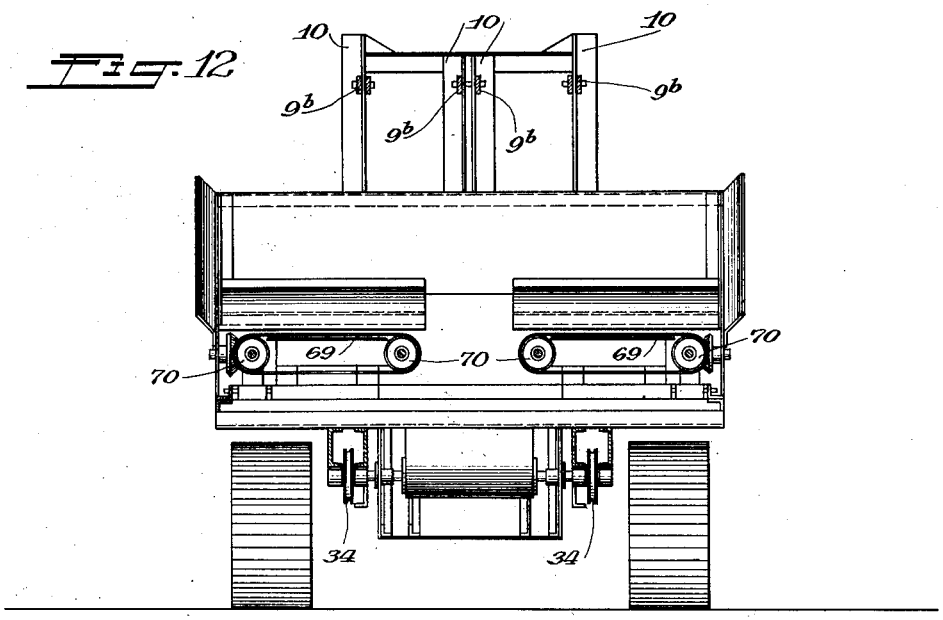
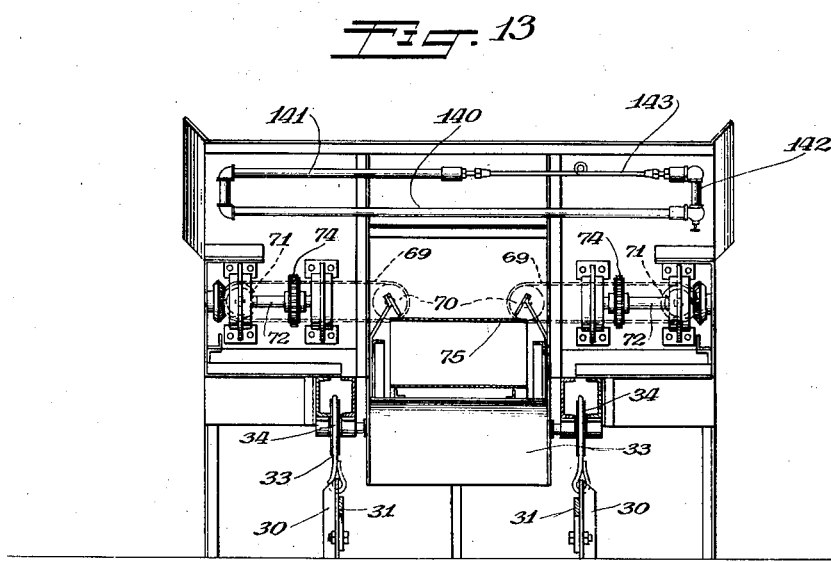

Inventor:
Harry H. Barber.
by: Charles T. Kelly
Attys.

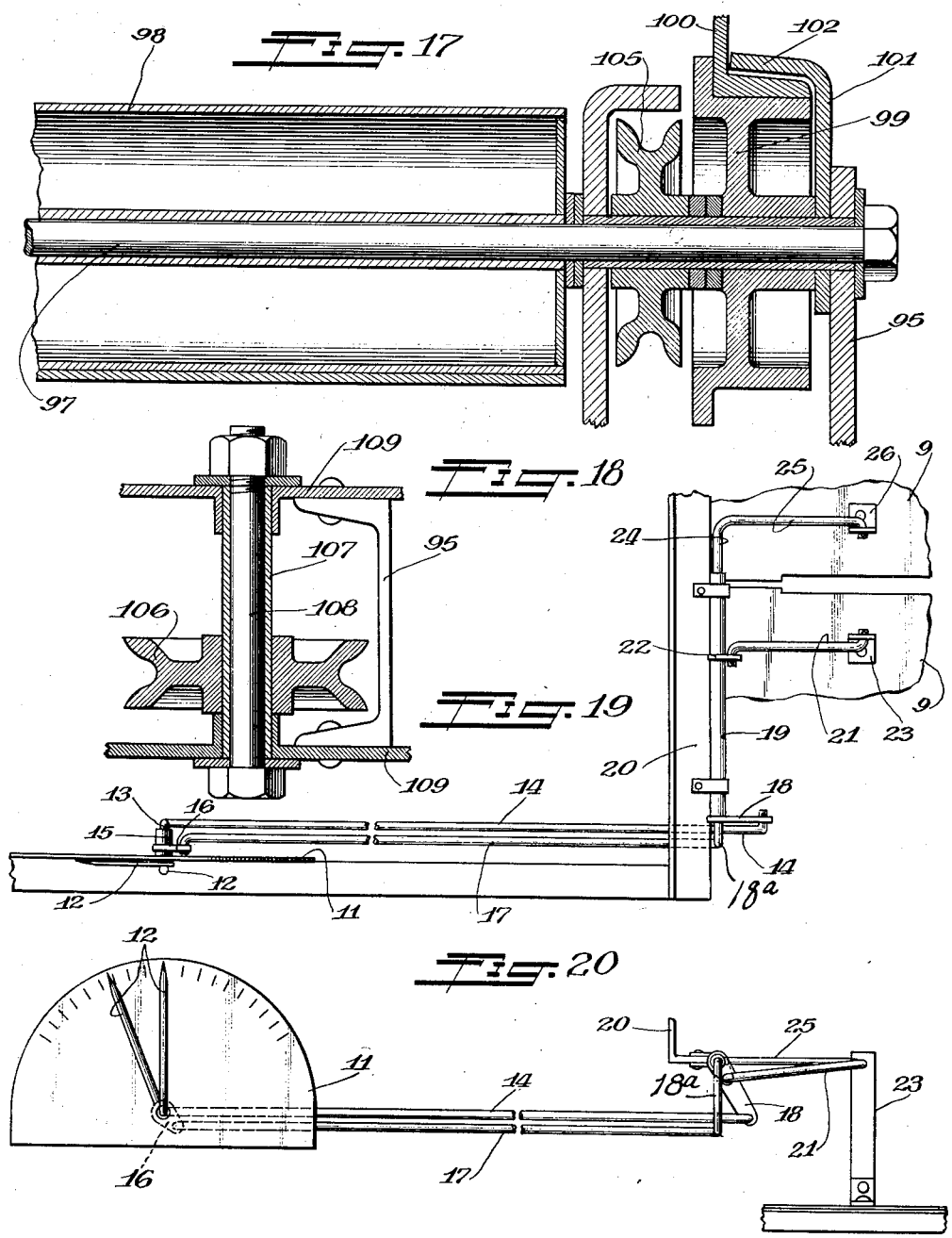

Patented Sept. 29, 1931

1,825,258

UNITED STATES PATENT OFFICE

HARRY H. BARBER, OF AURORA, ILLINOIS, ASSIGNOR TO BARBER-GREENE COMPANY, A CORPORATION OF ILLINOIS

EXCAVATOR

Application filed April 30, 1928. Serial No. 273,796.

This invention relates to an excavator adapted for various uses, such as excavating and grading a road, digging a canal or a cellar for a building or the like.

One of the characteristics of this machine resides in the use of a plurality of independent digging units which may be separately controlled for excavating at different elevations, together with indicating means for indicating the difference in elevation thereof.

A further characteristic resides in the fact that the excavated material is conveyed to a central longitudinally extending conveyor which extends to the rear end of the machine and which conveys the materal to a swivel conveyor which may be adjusted in azimuth for loading trucks with the excavated material.

Other novel features and advantages will become apparent in the following description and disclosures.

The invention comprises the novel structure and combination of parts hereinafter described and more particularly pointed out and defined in the appended claims.

In the accompanying drawings which illustrate a preferred embodiment of this invention and in which similar reference numerals refer to similar features in the different views:

Figure 1 is a side elevational view of an excavator involving this invention.

Figure 2 is a front end elevational view of the excavator.

Figure 3 is a rear end elevational view of the excavator.

Figure 4 is a top plan view of the excavator with parts omitted.

Figure 5 is an enlarged longitudinally extending sectional view taken substantially thru the vertical central plane of the machine.

Figure 6 is a plan view of the truck embodying the driving mechanism, with the super-structure removed.

Figure 7 is an enlarged fragmentary sectional view thru the machine.

Figure 8 is an enlarged top plan view of the structure and means for controlling the different excavating units.

Figure 9 is an enlarged side elevational view of the structure shown in Figure 8.

Figure 10 is an enlarged sectional and fragmentary view thru the machine illustrating the control for the excavating units.

Figure 11 is an enlarged sectional view upon the line XI—XI of Figure 9.

Figure 12 is a reduced sectional view taken substantially upon the line XIII—XIII of Figure 6, looking in the direction of the arrows.

Figure 13 is a sectional view taken substantially upon the line XIII—XIII of Figure 6, looking in the direction of the arrows.

Figure 16 is an enlarged sectional view thru a fragmentary portion of the bearing and operating means for the turntable.

Figure 17 is an enlarged fragmentary sectional view thru the supporting means for the swivel conveyor taken substantially upon the line XVII—XVII of Figure 1.

Figure 18 is an enlarged sectional view taken upon the line XVIII—XVIII of Figure 1.

Figure 19 is an enlarged top plan view of the indicating mechanism for the digging units.

Figure 20 is an enlarged side elevational view of the structure shown in Figure 19.

Figure 14:
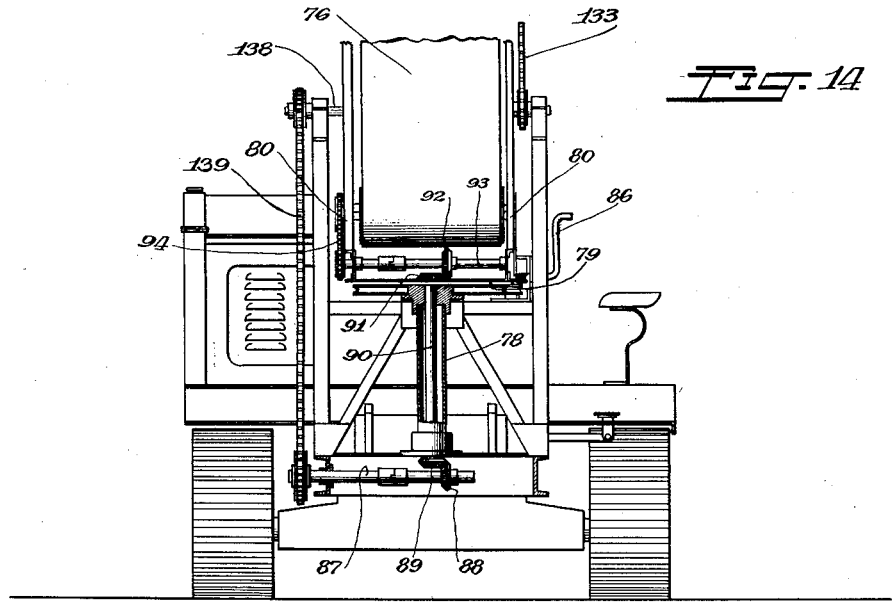
Figure 14 is a part sectional and part elevational view of a fragmentary part of the machine illustrating the turntable for the swivel conveyor with parts removed.

In the exemplification of this invention, there is shown an excavator of the crawler type which moves forwardly into its work. The excavation is performed by a plurality of independent digging units generally denoted by the reference numeral 1, (Fig. 1). While these digging units may assume various forms, as a matter of illustration, each unit is shown as consisting of an independent vertical boom 2 carrying a pair of endless digging members 3. In the present instance, the machine is shown as embodying two digging units. It is however, to be understood that the machine is not limited to two units.

Each boom 2 supports a driving shaft 4 for supporting the head sprockets for digging chains as is usual in the art. Each shaft also carries a sprocket 5 which is connected to a source of power. It will also be understood that each boom carries suitable lower sprockets for the endless digging members.

The sprockets 5 are connected by means of sprocket chains 6 with suitable sprocket wheels 7 (Fig. 4) upon a driving shaft 8, which is suitably journalled in the framework of the machine.

A yoke 9 is pivoted coaxially with each shaft 4. Each yoke 9 consists of a pair of arms 9a (Fig. 4) pivoted coaxially with said shaft 4. The other ends of the yokes 9 are provided with lugs 9b (Fig. 12) which are pivoted to flanges of upright angle standards 10. The angle standards 10 are sufficiently adjacent the driving shaft 8 to prevent any objectionable variations in the driving sprocket chains 6 as the booms are raised or lowered. It will, however, be apparent that the different excavating units are independently adjustable so that one may excavate at a lower or higher elevation than the other.

The difference in elevation between the digging units is indicated upon an indicator 11 (Figs. 1, 19 and 20). To this end, each pointer 12 of the indicator has a connection which extends adjacent a yoke 9 whereby the indicator becomes responsive to any movement of the yoke. One pointer 12 is secured upon the end of a pivot 13 integral with a link 14, while the other pointer 12 is secured to a bearing 15 surrounding the pivot 13. The bearing 15 is provided with a short crank 16 which is pivotally connected to a link 17. The link 14 is connected at its free end with a crank arm 18 secured to a rotatable sleeve 19 which is suitably sustained upon an angle member 20 extending between the angle standards 10. A link 21 is connected at one end with an arm 22 on the sleeve 19. The other end of the link 21 is pivotally connected to an upright member 23 secured to the top of a yoke 9.

The other link 17 has an upwardly extending crank 18a that terminates in a horizontal portion 24 that extends thru the sleeve 19. This horizontal portion terminates in an arm 25 which is pivoted at its free end in an upright 26 attached to the other yoke member 9. It might be mentioned that the linkage connections between the yokes and pointers is sufficiently loose to function properly.

In view of the foregoing structure, it will be apparent that when one excavating unit is at a different elevation than the other for any cause whatsoever, the difference in elevation will be shown on the indicator. The indicator will also show the relative elevation of both booms and the frame.

The mechanism for controlling the different digging units will now be set forth. The lower end of each boom has a pair of rearwardly extending plates 27 (Fig. 7) which support a scraper 28. Suitable cross braces 29 may connect these plates to rigidify the structure. Suitable angle pieces 30 are attached to the cross braces 29 adjacent the ends thereof, and thrust bars 31 (only one of which is shown) are pivoted at their forward ends to the angle pieces 30. The rear ends of the thrust bars 31 are pivoted to the crawler as indicated at 32. Each boom is suitably connected with a cable 33. Each cable extends over a pulley 34 (Figs. 8, 9 and 13) which is supported upon the frame of the truck. This cable 33 is wound several times around the pulley 34 and is then connected by means of a clevis 35 to a yoke 36 which in turn supports a shaft 37, upon which a plurality of pulleys 38 are journalled. In longitudinal alignment with the pulleys 38 is a second set of pulleys 39 (Fig. 11) which are supported upon a shaft 40 secured to angular plates 41 and 42 attached to the channel beam 43 of the truck frame. A hoisting cable 44 for one unit is anchored at one end to the framework of the machine as indicated at 45 and is then trained around the pulleys 38 and 39. The end of the cable 44 is then trained around a pulley 46 upon a shaft 47 and is secured to such pulley. It will, of course, be understood that the foregoing structure as set forth in this paragraph is a duplicate of the other excavating unit. In Figure 6 there is shown a second pulley 46a, upon a shaft 48, which winds up the cable for the other digging unit.

Each of the shafts 47 and 48 has a worm gear 49. An oblique shaft 50 is provided with a worm 51 meshing with the worm 49 on shaft 47. The shaft 50 extends below the worm and carries a sprocket gear 52 adapted to be secured to the shaft by the clutch 53. The shaft 50 is connected by means of a gimbal joint 54 (Fig. 10) with a second shaft section 50a equipped with a beveled pinion 55 adapted to be swung into mesh with either a pinion 56 or 57 rigidly secured upon a shaft 58.

A second oblique or downwardly extending shaft 59 (Fig. 6) parallel with the shaft 50 is suitably supported upon the machine and carries a sprocket gear 60 in alignment with the sprocket gear 52 on the shaft 50. A clutch 61 controls the relation of the sprocket gear 60 and its shaft 59. The shaft 59 also has a worm rigidly secured thereon which meshes with the worm wheel 49 on the shaft 48. A sprocket chain 62, shown in dotted lines in Figure 6, connects the sprocket gears 52 and 60. The particular manner of contacting the clutches 53 and 61 has not been illustrated, since it is contemplated that any suitable means may be employed.

The aforementioned shaft section 50a is adapted to be swung into engagement with either of the pinions 56 and 57. In Figure 10 there is shown the means for doing this. In referring to said figure, it will be noted that a lever 63 is pivoted intermediate its ends upon a crosspiece 64 of the framing. One end of this lever has a link connection 65 with the shaft 50a. The other end of the lever is connected to a link 66 connected to a crank or the like on a vertical operating rod 67 which has an upper offset operating handle which may be held in different positions by a suitable notched or locking segment 68. Proper rotation of the rod 67 will swing the pinion 55 into mesh with the desired pinions 56 or 57.

The shaft 58 is adapted to be driven by a source of power as will later more fully appear, and, as the pinion 55 is swung into engagement with one of the pinions 56 or 57, it will be rotated, causing shaft 50 to rotate therewith. The rotation of shaft 50 will rotate the shaft 47. Now, if the clutches 53 and 61 are in their operative position, the sprocket chain 62 will rotate shaft 59, which will, in turn, rotate shaft 48. The rotation of shafts 47 and 48 will wind or unwind the hoisting cables 44 on the drums 46 and 46a. When the clutches 53 and 61 are both in operative position, the shafts 47 and 48 will be simultaneously operated, for either simultaneously raising or lowering the different excavating units. However, when the clutches 53 and 61 are in inoperative position, only shaft 47 will be rotated, whereby one digging unit may be raised or lowered with respect to the other. Consequently, with this flexibility of the digging units, it is possible to adjust the same for digging at different elevations. This feature is especially advantageous in road work when it is desired to construct a beveled or sloping surface.

The excavated material of the different units is conveyed centrally of the machine by means of a pair of cross conveyors 69, which are in the form of endless belts passing over rotating elements 70. One rotatable element of each cross conveyor has a beveled pinion 71 coaxial therewith. A shaft 72 is suitably journalled in alignment with each cross conveyor 69, as clearly shown in Figure 6, and each shaft 72 carries a pinion 73 that meshes with the pinion 71. Each shaft 72 also carries a sprocket gear 74 which is connected to a source of power, as will later more fully appear.

The upper reach of each conveyor 69 travels toward the center of the machine and deposits its excavated material upon a central longitudinal conveyor, which is generally denoted by the reference numeral 75. The particular structure of this central longitudinal conveyor need not be specifically set forth, since the same may be of the well-known type consisting of an endless carrying belt. The central longitudinal conveyor may be supported upon the framework of the machine in any desired manner. The excavated material is then transported by the central longitudinal conveyor to a point at the rear end of the machine and is deposited upon a rearwardly extending swivel conveyor, generally denoted by the reference numeral 76.

Figure 15:
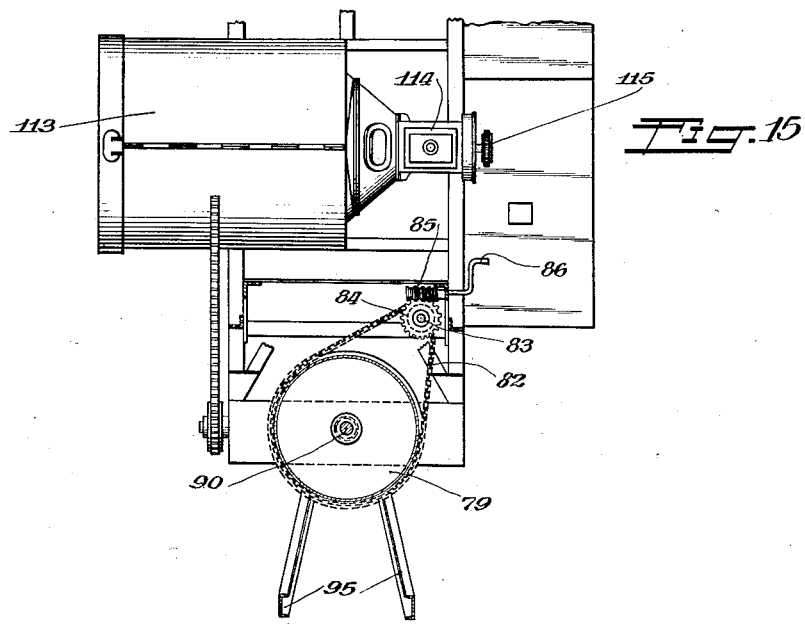
Figure 15 is a top plan view of the structure shown in Figure 14.

The swivel conveyor 76 may be of any approved construction which need not be described. The particular manner of supporting the conveyor so that it can swing to either side of the machine will be briefly set forth. Upon the rear end of the machine there is a bearing housing 77 (Fig. 16) upon which a hollow standard 78 is rotatably mounted. A turntable 79 is secured upon the top of the hollow standard 78. The turntable 79 is provided with a pair of spaced upstanding plates 80 (Figs. 5 and 14) and the swivel conveyor is provided with a driving shaft 81 which is journalled in the plates 80. It will be noted that the ends of the swivel conveyor extend between these plates for this purpose. This pivotal connection will allow the conveyor 76 to swing upwardly or downwardly. The turntable 79 is provided with a groove for receiving a driving chain 82 (Fig. 15) which surrounds a pulley on a shaft 83, said shaft being adapted to be driven by a worm wheel 84 and a manually operated worm 85, which is provided with a suitable hand crank 86.

It will be obvious that the operation of the crank 86 will rotate the sprocket chain 82 and rotate the turntable 79 for swinging the same in azimuth, whereby the conveyor 76 may be swung from one side of the machine to the other or to any intermediate point therebetween as may be desired, for unloading the excavated material onto trucks or the like or for depositing the same upon one side of the machine.

A driving shaft 87 extends thru the aforementioned housing 77. A beveled pinion 88 is fixed to the shaft 87 and meshes with a beveled pinion 89 upon the lower end of a vertical shaft 90, which extends thru the hollow standard 78 and thru the turntable 79. The upper end of the shaft 90 is provided with a beveled pinion 91 which meshes with a beveled pinion 92 on a shaft 93 which is geared with the shaft 81 by means of suitable sprocket gearing 94. It will, of course, be understood that the belt of the conveyor 76 is driven from the shaft 81. It will be obvious that the beveled pinions 91 and 92 will readily allow the turntable 79 to be swung in azimuth.

The swivel conveyor 76 is not only adapted to be adjusted in azimuth, but it is also adapted to be vertically adjusted in an up-and-down direction. To this end, a frame 95 (Figs. 1 and 3) is pivoted to a suitable collar 96 upon the base of the hollow standard 78. This frame is in the shape of an A, as shown in Figure 3, and, for this reason, it will be termed an A-frame. The upper end of the A-frame 95 supports a shaft 97 upon which a roller 98 is journalled and which roller forms a support for the swivel conveyor, as shown in Figure 1. The shaft 97 also supports a pair of flanged rollers 99 (Figs. 3 and 17) which are adapted to engage anchor members 100 on the conveyor.

With reference to Figure 17, it will be noted that a retaining plate 101 is secured to each side of the A-frame and overlaps the anchor member 100, as indicated at 102. These retaining plates 101 slidably anchor the upper end of the A-frame to the swivel conveyor.

In order to adjust the A-frame for elevating and lowering the swivel conveyor, a cable 103 (Fig. 1) is anchored to the conveyor as indicated at 104. This cable is trained over a pulley 105 (Fig. 17) upon the shaft 97. From the pulley 105 the cable passes downwardly, guided by a pulley 106 (Fig. 18) slidably mounted upon a sleeve 107 surrounding a bolt 108 which clamps a pair of plates 109 to one of the channel members of the A-frame 95. The pulley 106 guides the cable 103 inwardly and around a drum 110 carried by the A-frame and operated by a crank handle 111. In the drawings, a single cable 103 is shown upon one side of the swivel conveyor. It will be understood that a similar cable structure is adapted to be used upon the other side of the swivel conveyor and A-frame, in order to produce a balanced effort, the two cables being wound upon the same drum 110. The rotation of the crank 111 will either wind up the cable 103 or unwind the same, according to the direction of rotation. Assume that the cable 103 is wound upon the drum 110. It will then draw the roller 98 forwardly along the bottom of the swivel conveyor and thereby cause an elevation thereof. When the cable is unwound, the roller 98 will travel outwardly along the bottom of the conveyor and cause the same to be lowered.

Referring to Figure 1, it will be noted that the upper end of the conveyor 75 overlaps the conveyor 76. The upper end of the conveyor 75 is provided with a suitable guide 112 for directing the excavated material upon the swivel conveyor 76.

In connection with the foregoing machine, suitable driving mechanism has been illustrated for operating the bucket chains, the conveyors and tractor. While it is contemplated that any other form of driving mechanism than that herein illustrated may be used, as a matter of illustration, the following driving mechanism has been shown.

Referring to Figure 6, it will be noted that the crawler truck carries an engine 113, which may be of the internal combustion type. This engine is connected to a suitable variable transmission gearing, which is housed in the casing 114. This variable transmission in the housing 114 is connected by sprocket gearing 115 to a driving shaft 116. The driving shaft 116 is connected by sprocket gearing 117 with the aforementioned shaft 58 for raising and lowering the excavating units, as previously set forth. The shaft 58 is connected with suitable sprocket gearing 118 with a shaft 119 that extends into a gear housing 120 in which a variable transmission is contained. A shaft 121 extends from the transmission housing 120 and this shaft 121 is connected by suitable sprocket gearing 122 with a shaft 123. The shaft 123 is connected by suitable sprocket gearing 124 with the shafts for operating the crawler. The sprocket gearing 124 is controlled by suitable clutch and brake units 125 upon the shaft 123, and this driving mechanism is adapted to advance the crawler during its digging operation. The aforementioned shaft 116 is also connected by sprocket gearing 126 with the shaft 123 and this sprocket gearing 126 is controlled by a clutch 127 upon the shaft 116. The sprocket drive 126 is adapted to be used when the excavator is traveling idly and moving from place to place.

The aforementioned shaft 116 is connected by means of sprocket gearing 128 with the aforementioned shaft 8. The gear 129, upon the shaft 8, which forms a part of the sprocket gearing 128, is connected with the shaft 8 by means of a slip clutch, as shown in Figure 7. The shaft 8 drives the endless digging chains 3, thru the instrumentality of the aforementioned sprocket gearing 6. The shaft 8 is also connected by suitable sprocket gearing 130 with the aforementioned shafts 72, for operating the transverse or cross conveyors.

The shaft 116 is connected by sprocket gearing 131 to a shaft 132. The shaft 132 is connected by a sprocket chain 133 with the head shaft 134 of the central conveyor by means of a sprocket wheel 135. The chain 133 passes over the sprocket wheel 135 and around an idle sprocket wheel 136 (Fig. 1) and then around a sprocket wheel 137 on a shaft 138, and back to the initial sprocket wheel on shaft 132.

The shaft 138 extends to the opposite side of the machine and is connected by sprocket gearing 139 with the aforementioned shaft 87. The chain 133 hence drives the central conveyor 75 and also the swivel conveyor 76 thru the sprocket gearing 139, the vertical shaft 90 and the sprocket gearing 94.

A spirit level has been provided in connection with the machine for indicating any lateral inclination or tilting of the same. Such a level may be supported by the framework of the machine, as shown in Figure 13. It will be noted that a fluid pipe 140 extends transversely of the machine. The pipe 140 is connected at one end with an upper horizontal branch 141. The other end of this pipe has a vertical glass gauge 142 or the like for indicating lateral inclination of the machine. The upper branch 141 and the glass gauge 142 are preferably connected by an expansion rod 143.

Upon one side of the boom there is a pointer 144 (Fig. 2) which is adapted for cooperation with a grade line for indicating the depth at which the particular unit is digging. In connection therewith, if the other digging unit should be at a higher or lower level, any difference in elevation will be indicated on the aforementioned indicator 11. The machine is also provided with a small mirror 145 (Fig. 1) so that the operator may observe the operation of the conveyors and the unloading that is going on at the rear of the machine.

From the foregoing, it will be appreciated that a novel form of excavator has been provided which is susceptible of tearing away an embankment in very short order and which has a certain amount of flexibility in that the different digging units are susceptible of operating at different elevations, a feature which greatly extends the utility of the excavator.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In an excavating machine, a plurality of relatively adjustable excavating units, and an indicator responsive to the movement of one of said units for indicating the difference in elevation between said one unit and the other.

2. In an excavating machine, a plurality of digging units, means for adjusting one digging unit relative to another, means for indicating the depth of one digging unit and for indicating the relative elevation between said units.

3. In an excavator including a crawler, means including a power plant for propelling said crawler, means for supporting a plurality of digging units upon the front end of said crawler, a separate driving mechanism for each unit simultaneously operated from said power plant and means for relatively adjusting said units for digging at different elevations operated by said power plant.

4. In an excavator, a support, a plurality of radius arms pivoted on said support, a plurality of digging units attached to said arms, hoisting mechanism for each unit, and power operated means for adjusting one or more of said units.

5. In an excavator, a support, a plurality of radius arms pivoted to said support, a plurality of digging units pivoted to said arms, hoisting mechanism for each unit and power operated means for simultaneously operating said hoisting mechanisms for elevating or lowering said units.

6. In an excavator, supporting mechanism, a plurality of arms pivoted to said supporting mechanism, a set of digging booms carried by each arm, hoisting mechanism for each set of digging booms, and power operated means for simultaneously operating said hoisting mechanisms for elevating or lowering said booms.

7. In an excavator, supporting mechanism, a plurality of arms pivoted thereto, digging units carried by said arms, a hoisting mechanism for each unit, and power operated means for simultaneously operating said hoisting mechanisms or one of them.

8. In an excavator, including a crawler, supporting mechanism thereon, a pair of members pivoted to said mechanism, a digging unit carried by each member, hoisting mechanism for each unit, a power plant for propelling said crawler and mechanism operated by said power plant for relatively adjusting said units for digging at different elevations.

9. In an excavator including a crawler, a support upon the forward end of said crawler, a plurality of arms pivoted to said support and extending forward of said crawler, digging units carried by said arms for digging in advance of the crawler, hoisting mechanism for each unit, a power plant on said crawler and mechanism between said power plant and crawler for relatively adjusting said digging units.

10. In an excavator including a crawler, a power plant for propelling said crawler, a plurality of digging units supported upon the forward end of said crawler, hoisting mechanism for each digging unit and driving mechanism between said power plant and hoisting mechanism for relatively adjusting said units.

11. In an excavator, a plurality of digging units, an indicator and a connection between each digging unit and said indicator for indicating the relative digging depth thereof.

12. In an excavator, including a crawler, a support upon said crawler, a pair of arms pivoted upon said support, a digging unit carried by each arm, an indicator on said crawler and a connection between each arm and said indicator for indicating the relative digging depth thereof.

In testimony whereof I have hereunto subscribed my name.

HARRY H. BARBER.